(12) United States Patent
Arora et al.

(10) Patent No.: US 11,765,077 B1
(45) Date of Patent: *Sep. 19, 2023

(54) PING AND TRACEROUTE IN INTER-AUTONOMOUS SYSTEM (AS) SEGMENT ROUTING (SR) NETWORKS WITHOUT REQUIRING HEADEND ROUTER OR PATH MONITORING SYSTEM (PMS) CONTROLLER KNOWLEDGE OF TOPOLOGY OUTSIDE OF ORIGIN AS

(71) Applicant: Juniper Networks, Inc., Sunnyvale, CA (US)

(72) Inventors: Kapil Arora, Bangalore (IN); Samson P Ninan, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,016

(22) Filed: Apr. 12, 2022

Related U.S. Application Data

(63) Continuation of application No. 16/787,911, filed on Feb. 11, 2020.

(51) Int. Cl.
  *H04L 45/50* (2022.01)
  *H04L 45/00* (2022.01)
  *H04L 45/02* (2022.01)

(52) U.S. Cl.
  CPC ............ *H04L 45/50* (2013.01); *H04L 45/02* (2013.01); *H04L 45/04* (2013.01); *H04L 45/22* (2013.01)

(58) Field of Classification Search
  None
  See application file for complete search history.

(56) References Cited

U.S. PATENT DOCUMENTS

| | | | |
|---|---|---|---|
| 8,743,893 B2 * | 6/2014 | Cowie | H04W 40/18 370/395.31 |
| 10,917,337 B1 * | 2/2021 | Arora | H04L 45/34 |
| 11,025,522 B2 * | 6/2021 | Arora | H04L 45/08 |

(Continued)

*Primary Examiner* — Xavier S Wong
(74) *Attorney, Agent, or Firm* — John C. Pokotylo; Pokotylo Patent Services

(57) ABSTRACT

Ping or traceroute functionality is supported in a path spanning multiple autonomous systems (ASes) having segment routing (SR) enabled, the path including an ingress node in a first autonomous system (AS) and an egress node in an AS other than the first AS, using a reverse path label pair including (1) a node segment identifier (SID) corresponding to an AS Border Router (ASBR) of the second AS (second ASBR), and (2) an egress peer engineering (EPE) SID corresponding to a segment between the second ASBR to an ASBR of the first AS (first ASBR). Responsive to receiving a ping or traceroute request by a router in the second AS, the router generates a ping or traceroute reply including the reverse path label pair. The ping or traceroute reply is forwarded to the second ASBR using the node SID of the reverse path label pair. The ping or traceroute reply is then forwarded from the second ASBR to the first ASBR using the EPE SID of the reverse path label pair. Finally, the ping or traceroute reply can be forwarded (e.g., using standard IP forwarding) from the first ASBR to the headend router.

20 Claims, 11 Drawing Sheets

(56) References Cited

U.S. PATENT DOCUMENTS

| | | | | |
|---|---|---|---|---|
| 11,336,569 B2* | 5/2022 | Arora | ............... | H04L 45/22 |
| 2006/0198321 A1* | 9/2006 | Nadeau | ............... | H04L 45/50 |
| | | | | 370/254 |
| 2015/0304206 A1* | 10/2015 | Filsfils | ............... | H04L 45/46 |
| | | | | 709/238 |

* cited by examiner

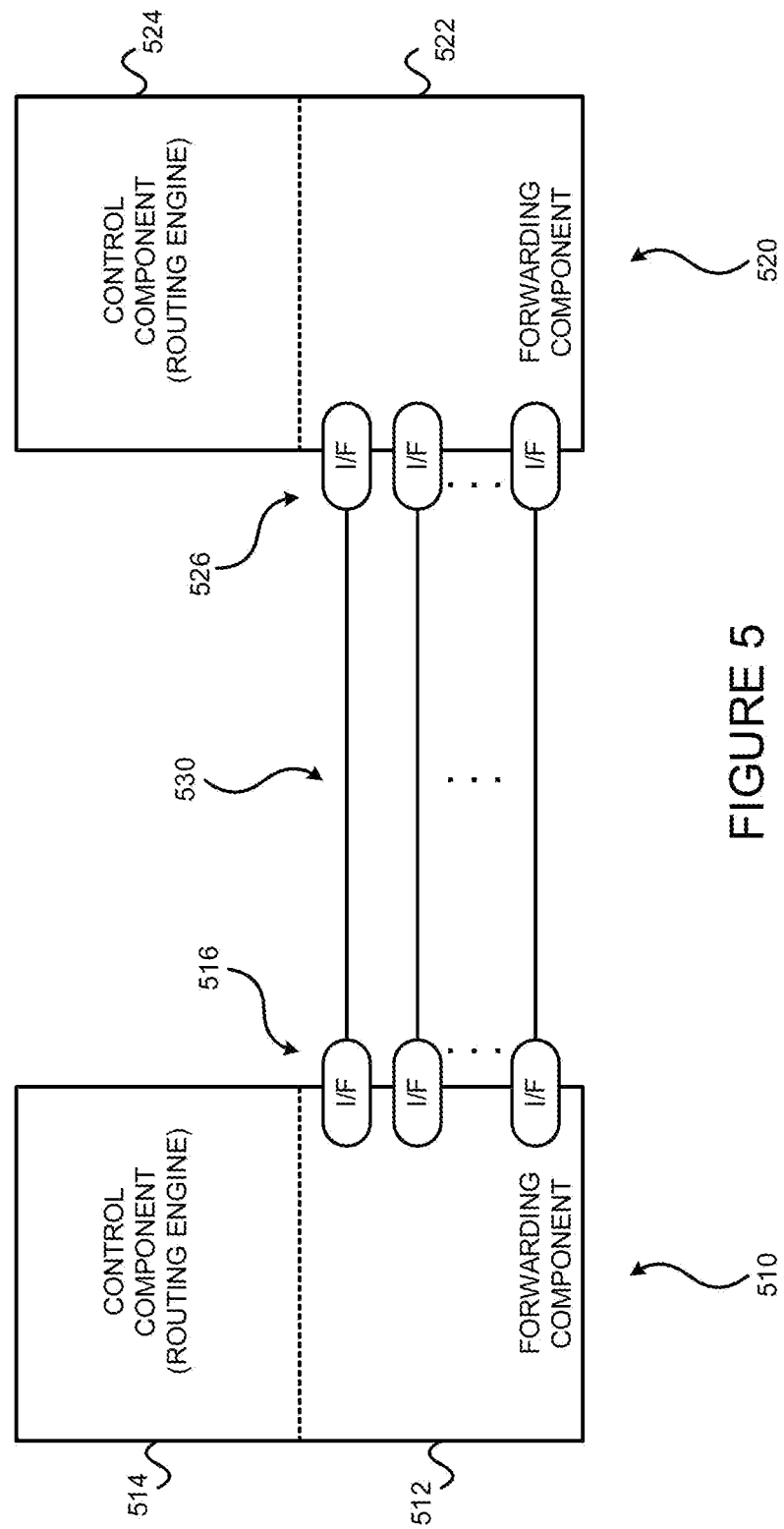

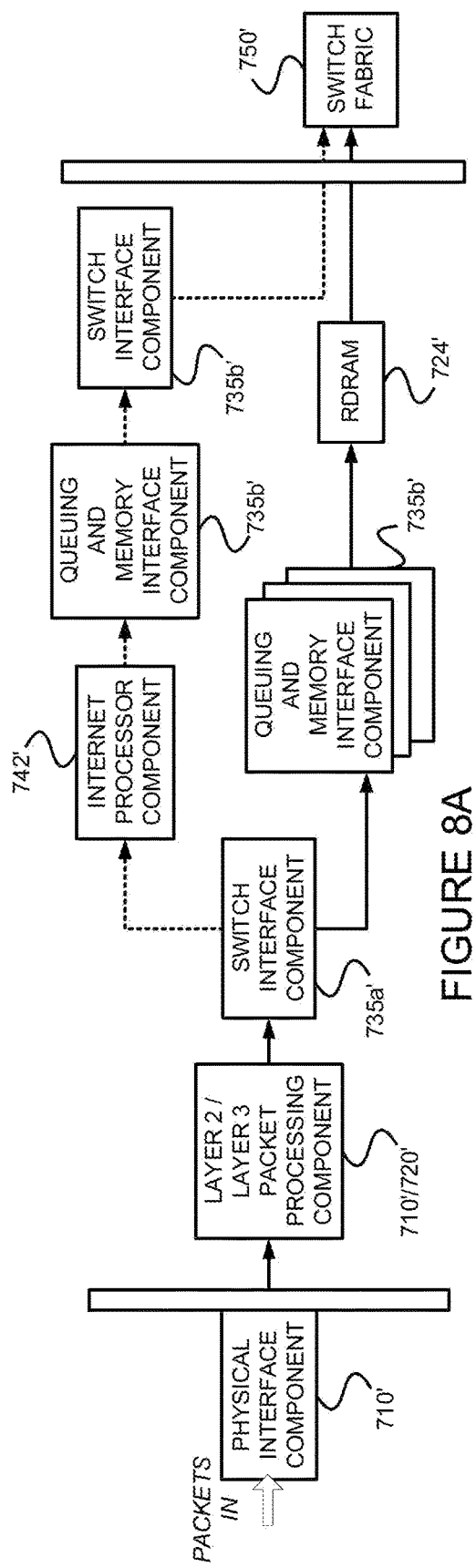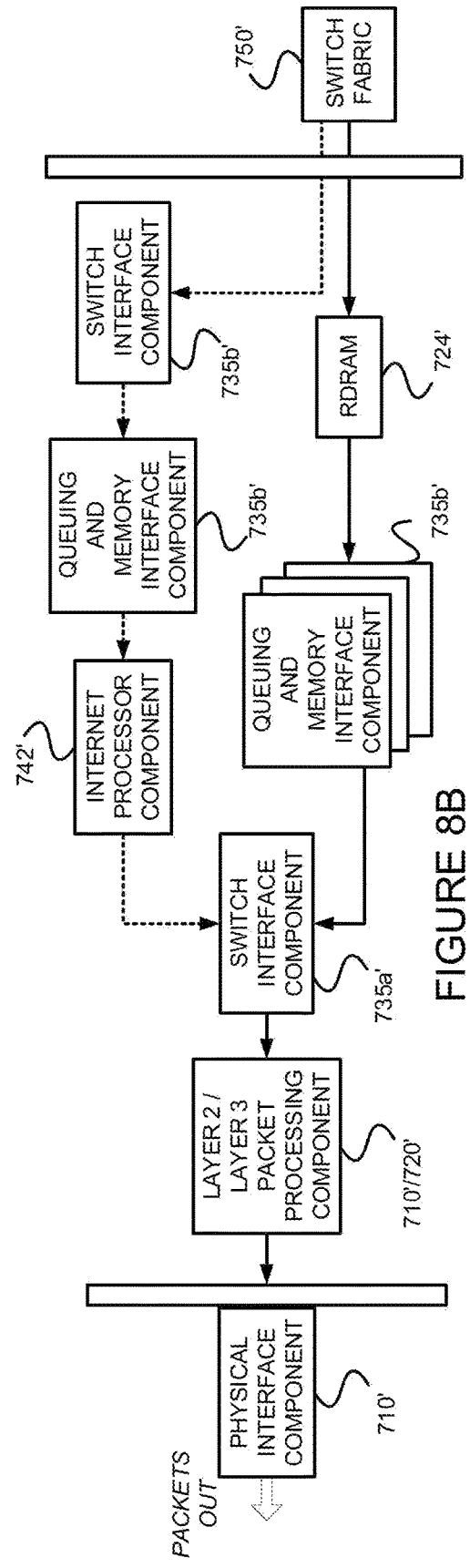
FIGURE 8A
FIGURE 8B

PING AND TRACEROUTE IN INTER-AUTONOMOUS SYSTEM (AS) SEGMENT ROUTING (SR) NETWORKS WITHOUT REQUIRING HEADEND ROUTER OR PATH MONITORING SYSTEM (PMS) CONTROLLER KNOWLEDGE OF TOPOLOGY OUTSIDE OF ORIGIN AS

§ 0. RELATED APPLICATION(S)

The present application is a continuation of U.S. patent application Ser. No. 16/787,911 (referred to as "the '911 application" and incorporated herein by reference), titled "PING AND TRACEROUTE IN INTER-AUTONOMOUS SYSTEM (AS) SEGMENT ROUTING (SR) NETWORKS WITHOUT REQUIRING HEADEND ROUTER OR PATH MONITORING SYSTEM (PMS) CONTROLLER KNOWLEDGE OF TOPOLOGY OUTSIDE OF ORIGIN AS," filed on Feb. 11, 2020, and listing Kapil Arora, Shraddha Hegde, and Samson P. Ninan as inventors.

§ 1. BACKGROUND OF THE INVENTION

§ 1.1 Field of the Invention

The present description concerns testing communications networks. In particular, the present description concerns testing communications networks using a segment routing architecture. (See, e.g., "Segment Routing Architecture," Request for Comments 8402 (Internet Engineering Task Force, July 2018) (referred to as "RFC 8402" and incorporated herein by reference). For example, the present description concerns checking a label switched path spanning more than one Autonomous System (AS).

§ 1.2 Background Information

§ 1.2.1 Segment Routing (SR) and the Communication of Segment Identifiers (SIDs)

In certain network deployments, network nodes under a single ownership or under a single administration are spread across different Autonomous Systems (ASes) to facilitate ease of management. Multiple AS network design may also result from network mergers and acquisitions. In such scenarios, connectivity across the different ASes can be established using Segment Routing. (Recall, e.g., RFC 8402.) Segment Routing also provides an easy and efficient way to provide interconnectivity in a large scale network as described in the Request for Comments (RFC) draft "Interconnecting Millions of Endpoints with Segment Routing," draft-filsfils-spring-large-scale-interconnect-13 (Internet Engineering Task Force, Mar. 5, 2019) (incorporated herein by reference).

FIG. 1 illustrates an example inter-AS segment routing (SR) network 100. In FIG. 1, "PE" denotes a provider edge router, "P" denotes a provider router, and "ASBR" denotes an AS border router. AS1 and AS2 are SR-enabled with node-segment identifiers (Node-SIDS) and adjacency segment identifiers (Adj-SIDS) advertised using an interior gateway protocol (IGP) such as open shortest path first (OSPF) or intermediate system-intermediate system (IS-IS). In the example network 100, the ASBRs advertise border gateway protocol (BGP) egress-peer-engineering segment identifiers (EPE SIDs) for the inter-AS links.

As shown, in some known systems, the topology of AS1 and of AS2 are advertised, via BGP-LS, to a path monitoring system (PMS) controller. The EPE-SIDs are also advertised via BGP-LS, as described in the RFC draft, "BGP-LS extensions for Segment Routing BGP Egress Peer Engineering," draft-ietf-idr-bgpls-segment-routing-epe-18" (IETF, Mar. 24, 2019) (incorporated herein by reference). The PMS controller acquires the complete database information (of the network topology of both ASes and their interconnections) and uses it to build end-to-end (e-2-e) traffic-engineered (TE) paths. The TE paths are downloaded from the PMS controller to ingress PE1, for example via netconf/bgp-sr-te or the "Path Computation Element (PCE) Protocol (PCEP)," Request for Comments 5440, 7896, 8253 and 8356 (Internet Engineering Task Force) (all four incorporated herein by reference). The headend node PE1 may also (or instead) acquire the complete database using BGP-LS.

The following notation is used for various types of SIDs. Node-SIDs are denoted with an "N-" prefix and the node (e.g., N-PE1, N-P1, N-P2, N-ASBR1, N-ASBR2, etc.). Adjacency SIDs (Adj-SIDs) are denoted with an "Adj-" prefix and include both nodes of the adjacency (e.g., Adj-PE1-P1, Adj-P1-P2, etc.). Egress-per-engineering SIDs (EPE-SIDs) are denoted with an "EPE-" prefix and include both border routers (e.g., EPE-ASBR1-ASBR2, EPE-ASBR4-ASBR3, etc.). Finally, binding-SIDs are denoted with a "BSID{number}" prefix and include both nodes of the binding (e.g., BSID1-ASBR3-PE4 , BSID2-ASBR3-ASBR4, etc.). Although not shown in FIG. 1, other types of SIDs, such as those described in RFC 8402 (e.g., prefix SIDs, anycast SIDs, BGP segments, etc.) can be used.

In the example network 100 of FIG. 1, e-2-e traffic engineered paths are built using Node-SIDs and Adj-SIDs. The paths within an AS may be represented using Binding-SIDs. Binding-SIDs are typically used to represent paths within an AS which will not change even if the actual path inside the AS changes due to changes in network topology. In this way, Binding-SIDs hide topology changes in one AS from another AS.

The document, S. Hegde, et al, "PMS/Head-end based MMPL Ping and Traceroute in Inter-AS SR Networks," draft-ninan-spring-mpls-inter-as-oam-00 (Internet Engineering Task Force, Jul. 4, 2019)(referred to as "the Hegde draft" and incorporated herein by reference) discusses using a reverse label stack in the context of inter-AS operation, administration and management (OAM). The Hegde draft assumes that the headend (or ingress) router and/or a PMS controller knows the entire topology of a multi-AS network, and can therefore determine a reverse path (and a corresponding reverse path label stack). This is also described in U.S. patent application Ser. No. 16/403,540 (referred to as "the '540 application" and incorporated herein by reference), filed on May 4, 2019, titled "PATH MONITORING SYSTEM (PMS) CONTROLLER OR INGRESS NODE BASED MULTIPROTOCOL LABEL SWITCHING (MPLS) PING AND TRACEROUTE IN INTER-AUTONOMOUS SYSTEM (AS) SEGMENT ROUTING (SR) NETWORKS," listing Kapil Arora and Shraddha Hegde as the inventors.

Unfortunately, however, the assumption that a PMS controller and/or a headend router have the necessary information to determine a reverse path from a router in another AS might not be true. Further, even if such information is available, reverse path determination can become complicated with traceroute since the headend (or ingress) router needs to determine a reverse label stack for each transit router visited, and for the egress router.

Therefore, this is a need to support ping and traceroute in multi-AS domains, even without assistance from a PMS controller, and even without the headend router having knowledge about the topology of another AS(es).

§ 2. SUMMARY OF THE INVENTION

This application describes mechanisms for testing inter-AS networks which are efficient and simple and can be easily deployed in SR networks.

Ping and/or traceroute functionality is supported in a multi-autonomous system (AS) segment routed (SR) path including a headend router in the first AS and an egress router in a second AS (other than the first AS), the first AS having a first AS border router (ASBR) and a second AS having a second ASBR peering with the first ASBR. This may be done by defining and storing (e.g., in router(s) of the second AS) a reverse path label pair including (1) a node segment identifier (SID) corresponding to the second ASBR of the second AS, and (2) an egress peer engineering (EPE) SID corresponding to a segment between the second ASBR and the first ASBR. A ping or traceroute request including the reverse path label pair is generated and sent from the headend router. Responsive to receiving the ping or traceroute request by a transit or egress router in the second AS, the validity of (e.g., a FEC included in) the ping or traceroute request is checked, a ping or traceroute reply including the reverse path label pair is generated, and the ping or traceroute reply is forwarded to the second ASBR using the node SID of the reverse path label pair. Responsive to receiving, by the second ASBR (in the second AS), the ping or traceroute reply, the ping or traceroute reply is forwarded from the second ASBR to the first ASBR using the EPE SID of the reverse path label pair. Responsive to receiving, by the first ASBR (in the first AS), the ping or traceroute reply, the ping or traceroute reply is forwarded from the first ASBR to the headend router. Note that since the first ASBR and the headend router are in the same AS, no reverse label information is needed to get the reply back to the headend router from the first ASBR. Responsive to receiving the ping or traceroute reply by the headend router, the ping or traceroute reply may be processed in a normal or conventional manner.

In some example embodiments, the reverse path label pair is provided (e.g., as an input parameter of a ping command) on the headend router in the first AS. Such routers can include the reverse path label pair in ping or traceroute replies. In some other example embodiments, the reverse path label pair is provided on an ASBR in the second AS and returned to the headend router in a ping or traceroute reply. The headend router may then include the reverse path label pair in subsequent ping or traceroute requests.

In some example embodiments, the act of forwarding the ping or traceroute reply from the first ASBR to the headend router is performed using normal Internet protocol (IP) forwarding. For example, the act of forwarding the ping or traceroute reply from the first ASBR to the headend router may be performed using forwarding information learned from an interior gateway protocol (IGP) run within the first AS.

The egress router may be in the second AS, or may be in some other AS (other than the first AS).

The (e.g., SR) path being tested may (though it need not) include the second ASBR.

The (e.g., SR) path being tested may (though it need not) include the first ASBR.

§ 3. BRIEF DESCRIPTION OF THE DRAWINGS

FIG. 5 illustrates an example environment including two systems coupled via communications links.

FIGS. 8A and 8B illustrate example packet forwarding operations of the example distributed ASICs of FIG. 7.

§ 4. DETAILED DESCRIPTION

The present description may involve novel methods, apparatus, message formats, and/or data structures for supporting Inter-AS ping and traceroute, without the need for a PMS controller or headend router to have knowledge about network topology outside the AS to which the headend router belongs. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Method(s)

Figure 2:
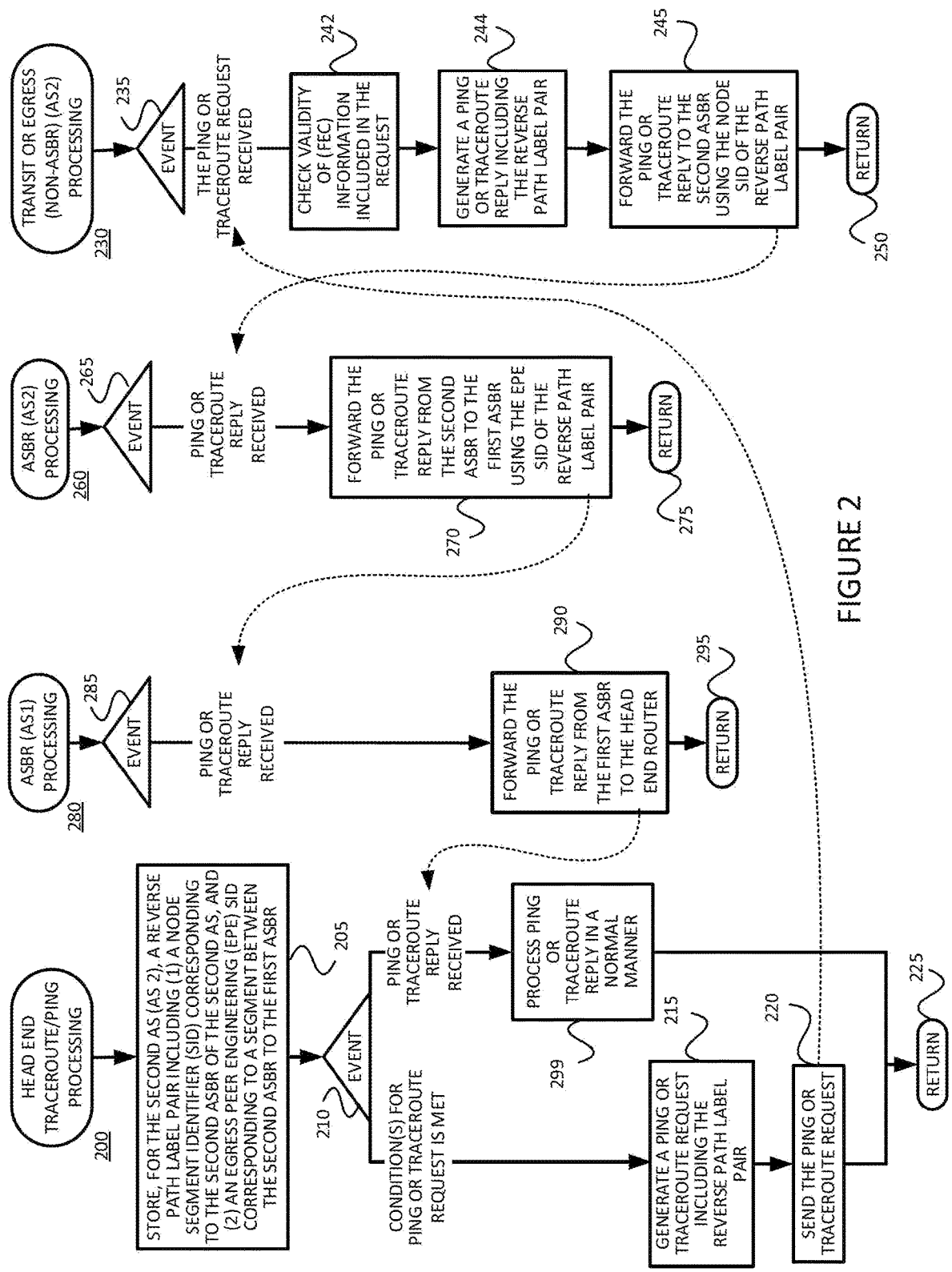
FIG. 2 is a flow diagram of an example method for performing ping or traceroute in an inter-AS SR network in a manner consistent with the present description.

FIG. 2 is a flow diagram of a first example method for performing ping or traceroute in an inter-AS segment routing (SR) network in a manner consistent with the present description. This first example method defines a label pair for each peer AS. The defined label pair includes a node SID corresponding to an ASBR and an EPE label. A label stack including this label pair can be used in all inter-AS ping and traceroute without much intelligence at the headend (or ingress). The headend can be any router. The replying router uses its database to select, as appropriate, either (A) normal IP forwarding or (B) the reverse label stack.

As shown, the method of FIG. 2 can be distributed, with a portion 200 performed by the headend router in a first AS, a portion 230 performed by a transit or egress router in a second AS, a portion 260 performed by an ASBR (that belongs to the reverse path as specified in a node-SID) in the second AS, and a portion 280 performed by an ASBR in the first AS. Collectively, these portions provide a method for determining a reverse path label pair for use in ping request or traceroute operations in a multi-autonomous system (AS) segment routed (SR) path including a headend router in the first AS and an egress router in a second AS (other than the first AS), the first AS having a first AS border router (ASBR) and a second AS having a second ASBR peering with the first ASBR.

Referring first to portion 200 of the example method, a reverse path label pair including (1) a node segment identifier (SID) corresponding to the second ASBR of the second AS, and (2) an egress peer engineering (EPE) SID corresponding to a segment between the second ASBR to the first ASBR, is defined and stored (Block 205). Referring to event branch point 210, if a condition(s) for a ping or traceroute is met, the method portion 200 generates a ping or traceroute request including the reverse path label pair (Block 215) and sends, from the headend router, the ping or traceroute request (Block 220) before the portion 200 of the example method is left (Return Node 225).

Referring now to the portion 230 of the example method, responsive to receiving, by a transit or egress router in the second AS (even an ASBR in the second AS other than the ASBR on the reverse path), the ping or traceroute request (Event 235), the validity of (e.g., a FEC included in) the ping or traceroute request is checked (Block 242), a ping or traceroute reply including the reverse path label pair is generated (Block 244) (e.g., in the manner described in the '540 application), and the ping or traceroute reply is forwarded to the second ASBR using the node SID of the reverse path label pair (Block 245), before the portion 230 of the example method is left (Return Node 250).

Referring now to portion 260 of the example method, responsive to receiving, by the second ASBR (in the second AS), the ping or traceroute reply (Event 265), the ping or traceroute reply is forwarded from the second ASBR to the first ASBR using the EPE SID of the reverse path label pair (Block 270) before the portion 260 of the example method is left (Return Node 275).

Referring to portion 280 of the example method, responsive to receiving, by the first ASBR (in the first AS), the ping or traceroute reply (Event 285), the ping or traceroute reply is forwarded from the first ASBR to the headend router (Block 290), before the portion 280 of the example method is left (Return Node 295). Note that since the first ASBR and the headend router are in the same AS, no reverse label information is needed to get the reply back to the headend router.

Finally, referring to event 210, responsive to receiving the ping or traceroute reply by the headend router, the portion 200 of the example method processes the ping or traceroute reply (e.g., in a normal or conventional manner, or in the manner described in the '540 application) (Block 299), before the portion 200 of the example method is left (Return Node 225).

Referring back to block 290, in some example embodiments consistent with the example method, the act of forwarding the ping or traceroute reply from the first ASBR to the headend router is performed using normal Internet protocol (IP) forwarding. For example, the act of forwarding the ping or traceroute reply from the first ASBR to the headend router may be performed using forwarding information based on network topology learned from an interior gateway protocol (IGP) run within the first AS.

The egress router may be in the second AS, or may be in some other AS (other than the first AS).

The (e.g., SR) path being tested may (though it need not) include the second ASBR.

The (e.g., SR) path being tested may (though it need not) include the first ASBR.

If the first example method is used, IP addresses should be unique across the first and second ASes.

Figure 3:
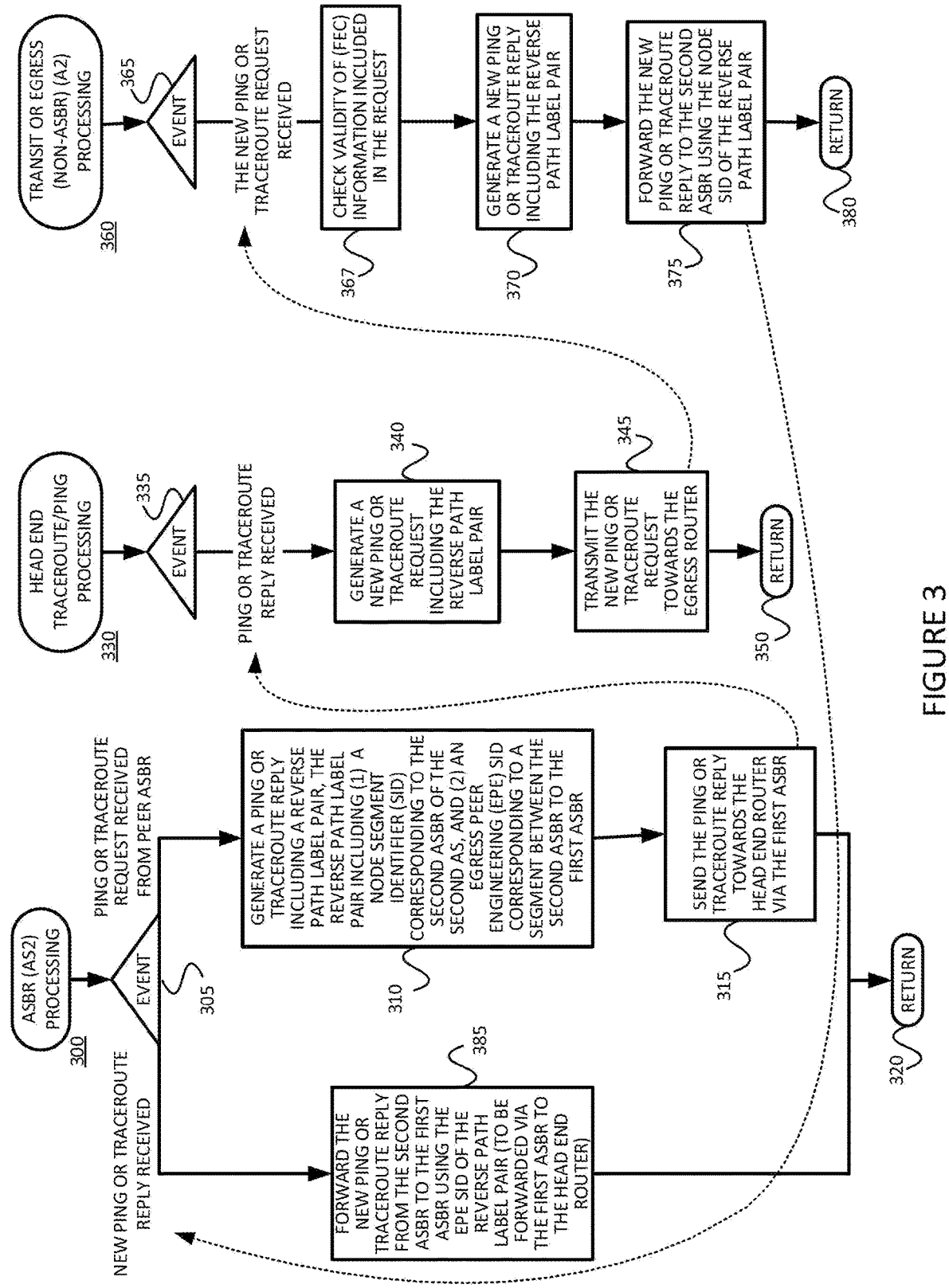
FIG. 3 is a flow diagram of an example method for performing ping or traceroute in an inter-AS SR network in a manner consistent with the present description.

FIG. 3 is a flow diagram of a second example method for performing ping or traceroute in an inter-AS SR network in a manner consistent with the present description. With this second example method, transit ASBR routers convey a reverse label stack in a ping or traceroute reply.

As shown, the method of FIG. 3 can be distributed, with a portion 300 performed by an ASBR in a second AS (i.e., an AS not including the headend router), a portion 330 performed by the headend router in a first AS, and a portion 360 performed by a transit or egress (e.g., non-ASBR) router in the second AS. Collectively, these portions provide a method for facilitating ping request or traceroute operations in a multi-autonomous system (AS) segment routed path including the headend router in the first AS and an egress router in an AS other than the first AS. The first AS has a first AS border router (ASBR) and the second AS has a second ASBR peering with the first ASBR.

Referring first to portion 300 of the example method, responsive to receiving, by the second ASBR (in the second AS), a ping or traceroute request (e.g., from a peer ASBR) (Event 305), a ping or traceroute reply including a (e.g., previously determined or provisioned, and stored) reverse path label pair is generated, the reverse path label pair including (1) a node segment identifier (SID) corresponding to the second ASBR of the second AS, and (2) an egress peer engineering (EPE) SID corresponding to a segment between the second ASBR to the first ASBR. (Block 310) The second ASBR then sends the ping or traceroute reply towards the headend router via the first ASBR (Block 315), before the portion 300 of the second example method is left (Return Node 320).

Referring next to the portion 330 of the second example method, responsive to receiving, by the headend router, the ping or traceroute reply (Event 335), the headend router can generate a new ping or traceroute request including the reverse path label pair (Block 340), and transmit the new ping or traceroute request towards the egress router of the path being tested (Block 345), before the method is left (Return Node 350). Although not shown, the headend router may also perform standard or normal processing of the reply, or process the reply in the manner described in the '540 application.

Finally, referring to the portion 360 of the second example method, responsive to receiving the new ping or traceroute request by a router in the second AS (other than the second ASBR) (Event 365), the router checks the validity of (e.g., a FEC included in) the request (Block 367), generates a new ping or traceroute reply including the reverse path label pair (Block 370), and forwards the new ping or traceroute reply to the second ASBR using the node SID of the reverse path label pair (Block 375), before the portion 360 of the second example method is left (Return Node 380)

Referring back to event branch point 305 of portion 300 of the second example method, responsive to receiving the ping or traceroute reply, the second ASBR forwards the new ping or traceroute reply to the first ASBR using the EPE SID of the reverse path label pair. Although not shown, the act of forwarding the new ping or traceroute reply from the first ASBR to the headend router may be performed using normal Internet protocol (IP) forwarding. For example, the act of forwarding the new ping or traceroute reply from the first ASBR to the headend router may be performed using forwarding information learned from an interior gateway protocol (IGP) run within the first AS.

The egress router may be in the second AS, or may be in some other AS (other than the first AS).

The (e.g., SR) path being tested may (though it need not) include the second ASBR.

The (e.g., SR) path being tested may (though it need not) include the first ASBR.

§ 4.2 Example Operations of Example Methods

Figure 1:
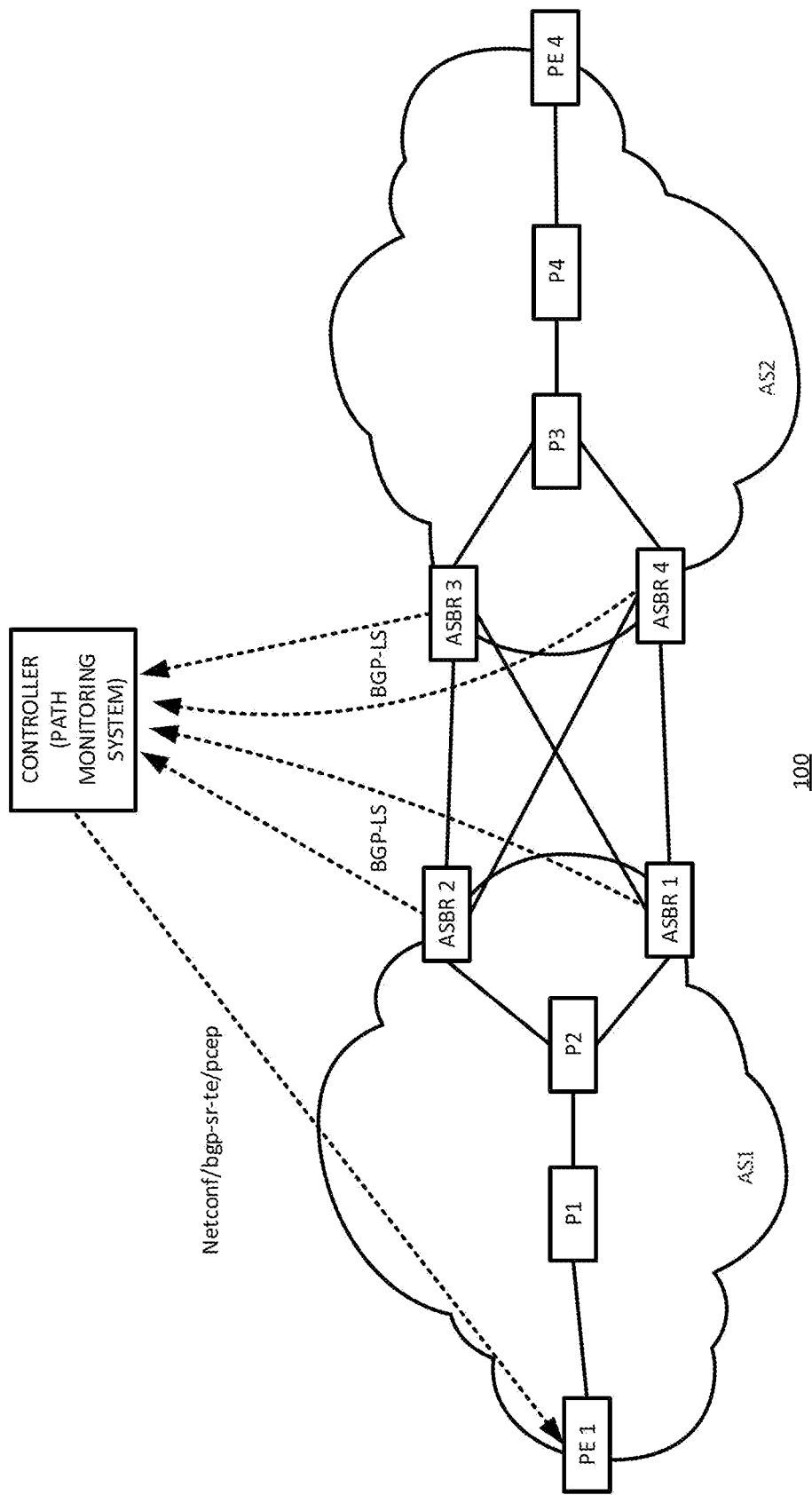
FIG. 1 illustrates an example inter-AS segment routing (SR) network in which example embodiments consistent with the present description may be used.
Figure 4A:
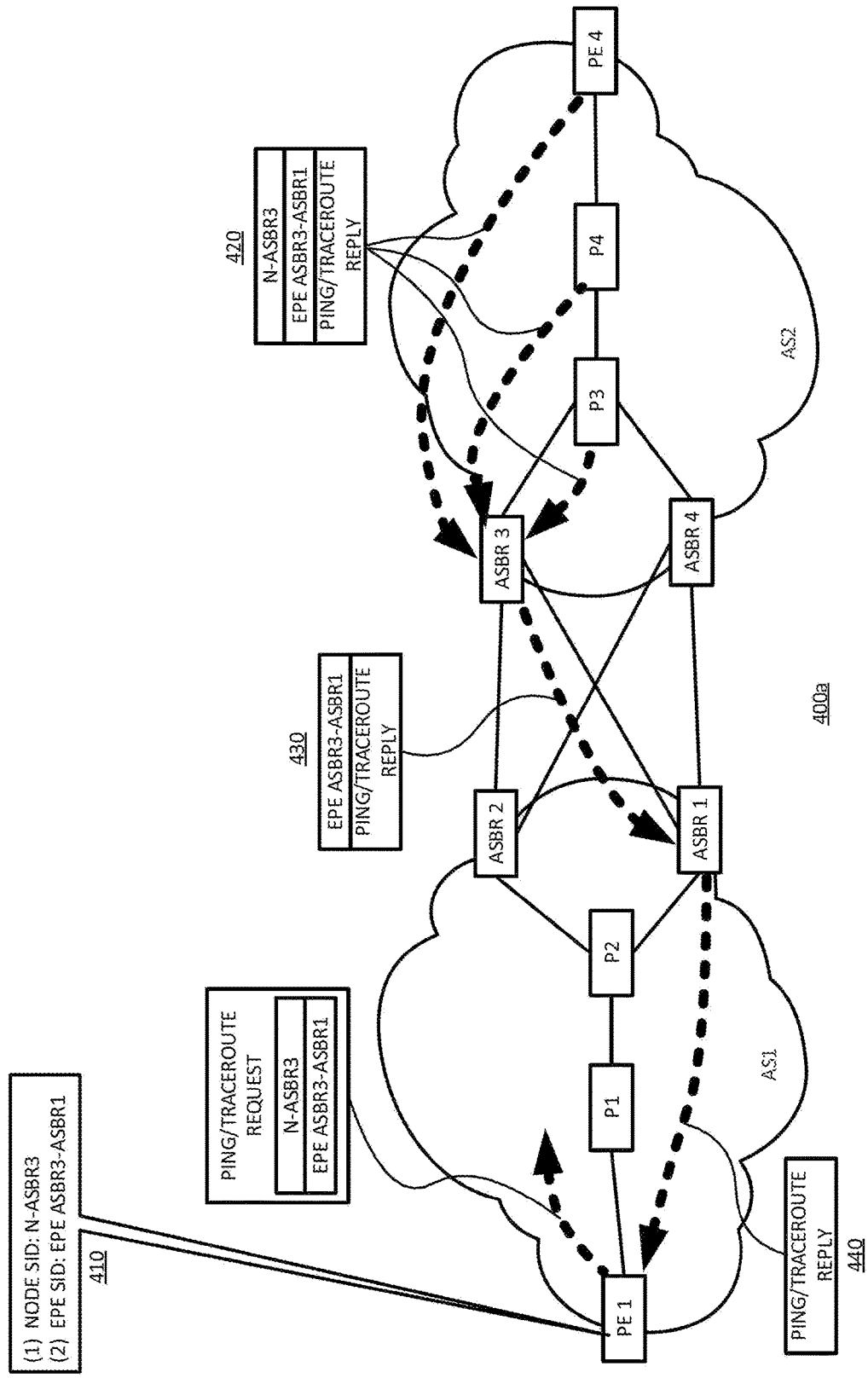
FIG. 4A illustrates operations of an example ping or traceroute method, consistent with the example method of FIG. 2, in an inter-AS SR network.

FIG. 4A illustrates operations of the first example method of FIG. 2 in the context of a multi-AS network having a topology 400a corresponding to that of FIG. 1. For a ping or traceroute request from any router in AS1 to any (e.g., non-ASBR) router in AS2, a reverse path label stack with (1) EPE EPE ASBR3-ASBR1 and (2) Node SID: N-ASBR3 is provided on the headend router PE1. (See reverse path label stack information in 410.) Assume a path from PE1 to PE4 is being tested. When a ping or traceroute request packet reaches PE4 (or P3 or P4), PE4 uses the information in the return path label stack to send a ping or traceroute reply (which is needed since PE1 is not reachable via normal IP routing). (Recall, e.g., 244 and 245 of FIG. 2.) Node SID: N-ASBR3 will help the ping or traceroute reply packet reach ASBR3. Then the EPE EPE ASBR3-ASBR1 label will help the ping or traceroute reply packet to reach ASBR1 in AS1. (Recall, e.g., 270 of FIG. 2.) Once the ping or traceroute reply packet reaches AS1, its destination address (PE1) is reachable and normal IP forwarding can be used to help the ping or traceroute reply packet to get back to PE1. (Recall, e.g., 290 of FIG. 2.)

Above procedure will apply seamlessly in the context of traceroute too. Still referring to FIG. 4A, consider a traceroute from PE1 to PE4. All routers in AS1 (e.g., P1, P2, ASBR1, and/or ASBR2) will not need to use a return path label stack to get the traceroute reply back to PE 1. This is because the source address (of headend PE1) is in same AS (AS1) and therefore reachable (e.g., using network topology information learned via an IGP). When routers in AS2 (other than the one ASBR with its node SID on the reverse path) reply, they can use the return path label stack. For example, ASBR3 can identify its node-SID and EPE SID labels in the label stack included in the traceroute reply. So ASBR3 can send the traceroute reply packet without any issue. All other routers in AS2 on the path being tested (e.g., P3, P4 and PE4) will keep the EPE SID: EPE ASBR3-ASBR1 as an inner label and ASBR3's node-SID as an outer label. This simplified return path label stack approach can be used in the case of two, back to back, inter-ASes.

Figure 4B:
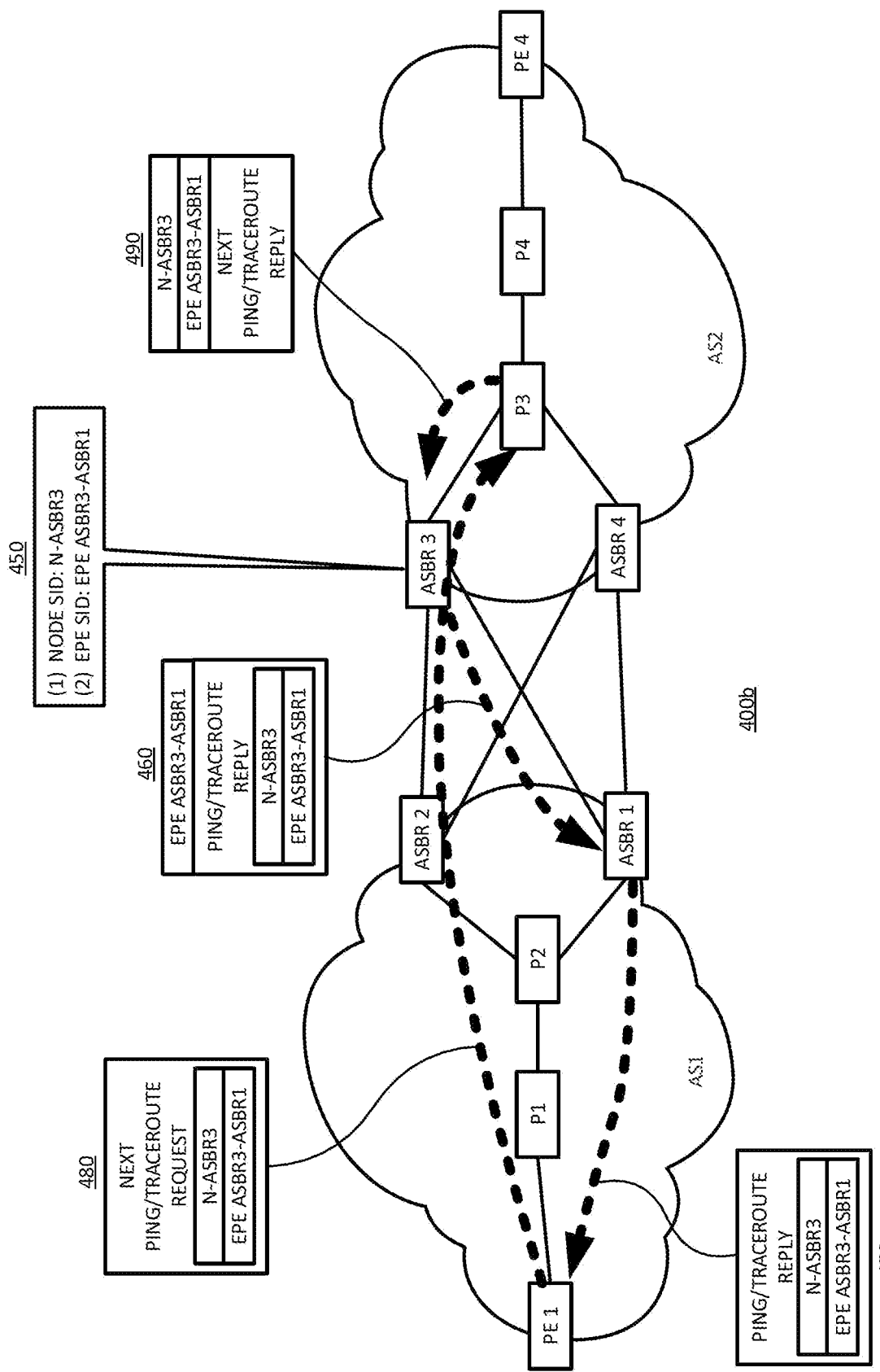
FIG. 4B illustrates operations of an example ping or traceroute method, consistent with the example method of FIG. 3, in an inter-AS SR network.

FIG. 4B illustrates operations of the second example method of FIG. 3 in the context of a multi-AS network having a topology 400b corresponding to that of FIG. 1. In this example, only the ASBR(s) in AS2 (in this case ASBR3, and perhaps ASBR4 also) are provided with return path label stack information 450. This includes Node SID: N-ASBR3 and EPE EPE ABR3-ASBR1. Once a traceroute request reaches ASBR3 from AS1, ASBR3 can include the reverse path label stack in the traceroute reply (460). (Recall, e.g., 310 and 315 of FIG. 3.) When the headend node receives this reply (470), it can put the reverse path label stack into subsequent traceroute requests (480). (Recall, e.g., 340 and 345 of FIG. 3.) Later, (e.g., non-ASBR) routers in AS2 can use the reverse path label stack in subsequent traceroute replies (490), which can be used to get the reply to ASBR3 (Recall, e.g., 370 and 375 of FIG. 3.), and then to ASBR1. Once the traceroute reply reaches ASBR1, normal IP forwarding can be used to get the reply back to the headend router (PE1). This dynamic building of a reverse path label stack can be useful in case of OAM activities which span across multiple Autonomous systems.

§ 4.3 Example Apparatus

The data communications network nodes (e.g., PEs, Ps, ASBRs, etc.) may be forwarding devices, such as routers for example. FIG. 5 illustrates two data forwarding systems 510 and 520 coupled via communications links 530. The links may be physical links or "wireless" links. The data forwarding systems 510,520 may be routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 649, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635, and the label-based forwarding protocol process(es) 640 may support protocols such as BGP 635, the label distribution protocol ("LDP") 641, the resource reservation protocol ("RSVP") 642, Ethernet virtual private network (EVPN) 643, layer 2 (L2) VPN 644 and segment routing (SR) 645. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692 over hardware components (e.g., ASICs, switch fabric, optics, etc.) 691, interface process(es) 693, distributed ASICs 694, chassis process(es) 695 and forwarding (e.g., route-based and/or label-based) table(s) 696.

Figure 6:
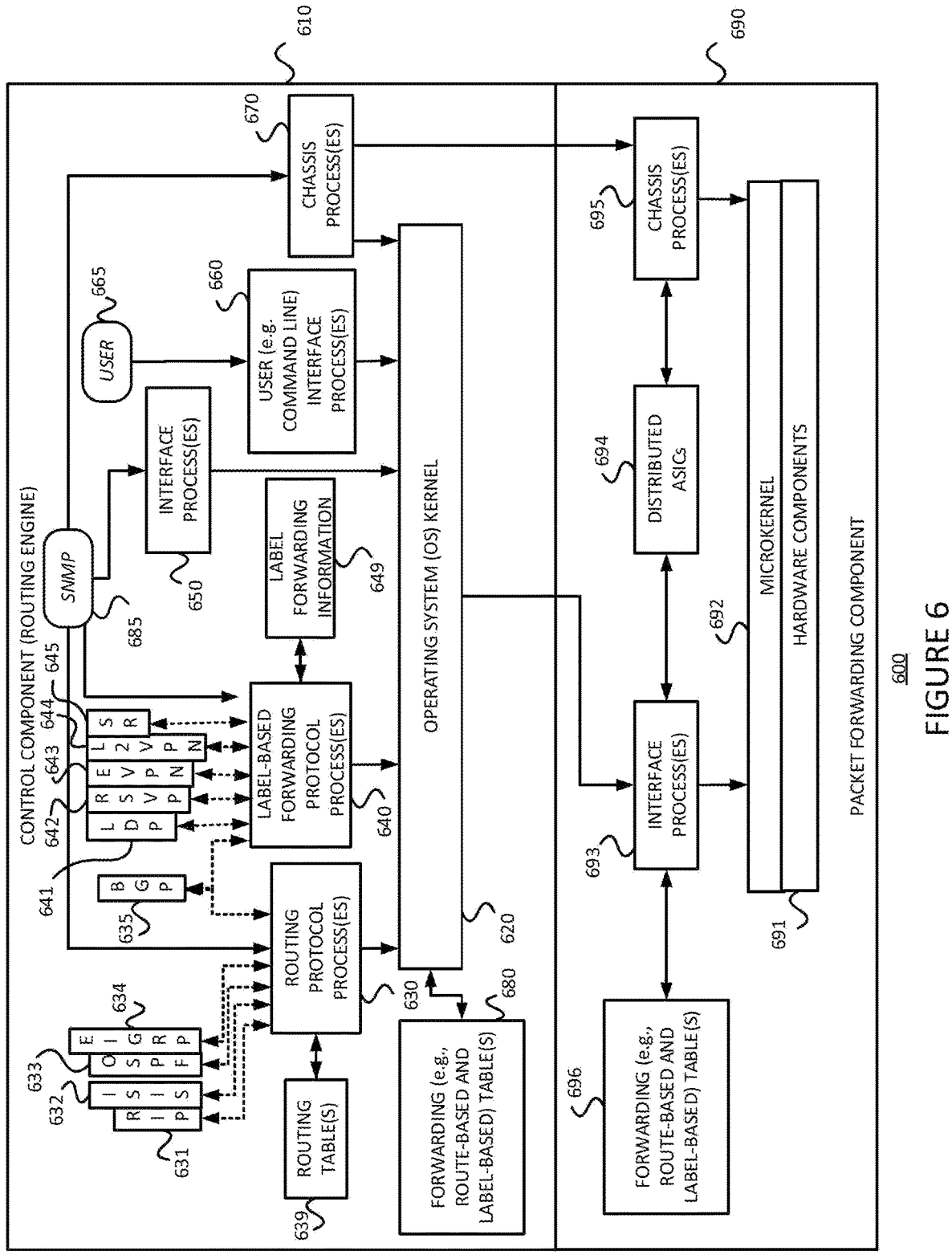
FIG. 6 is a block diagram of an example router on which one or more aspects of the present disclosure may be implemented.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 641, RSVP 642, EVPN 643, L2VPN 644 and SR 645 (and BGP 635) protocols are provided. Naturally, other label-based forwarding protocols (e.g., MPLS, etc.) may be provided in addition, or alternatively. In the example router 600, the routing table(s) 639 is produced by the routing protocol process(es) 630, while the label forwarding information 649 is produced by the label-based forwarding protocol process(es) 640.

Still referring to FIG. 6, the interface process(es) 650 performs configuration of the physical interfaces and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692 over hardware components 691, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

Figure 7:
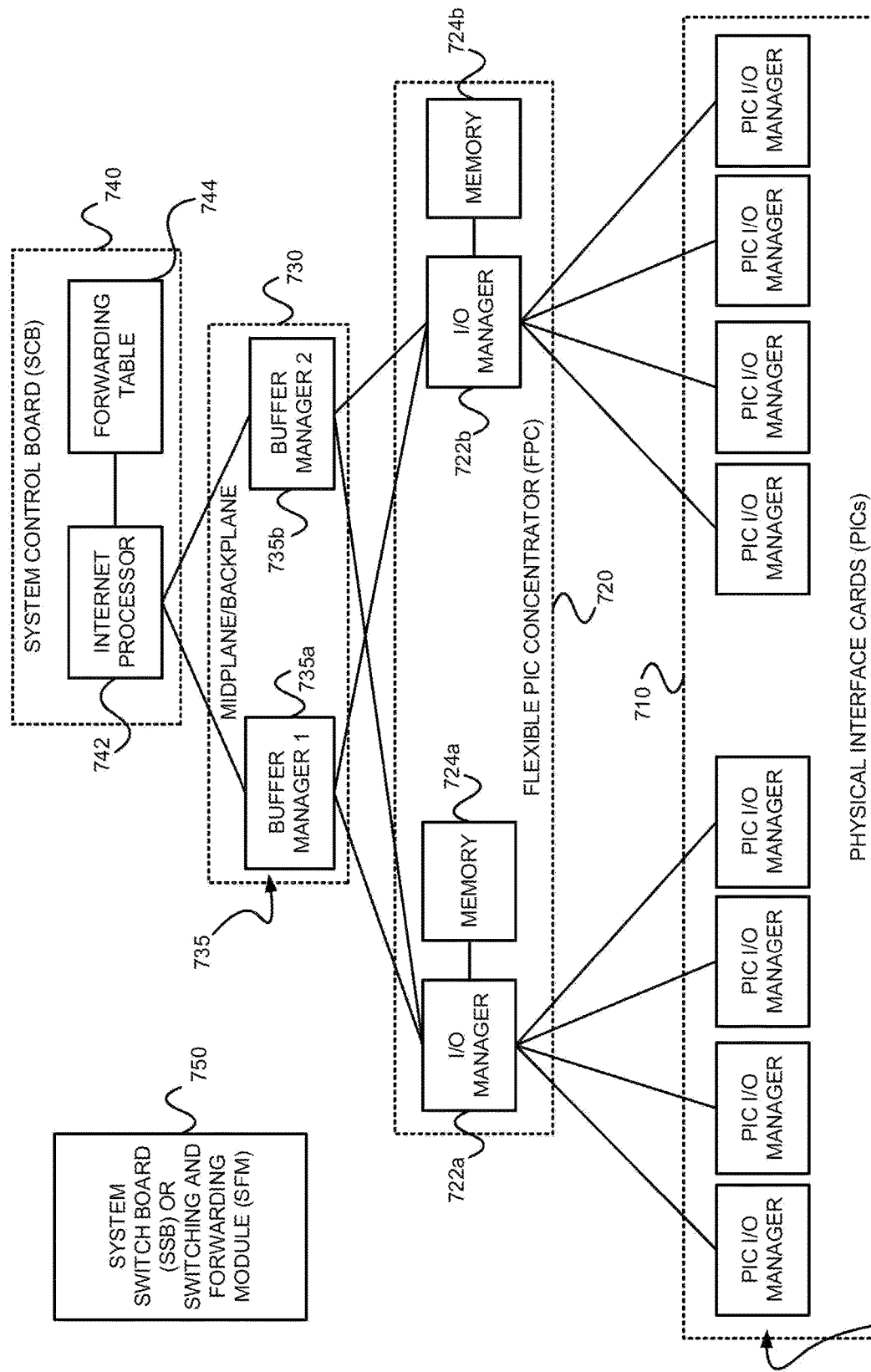
FIG. 7 is a block diagram of example distributed application specific integrated circuits ("ASICs") that may be provided in the example router of FIG. 6.

FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,610' contains at least one I/O manager ASIC 715 responsible for media-specific tasks, such as encapsulation. The packets pass through these I/O ASICs on their way into and out of the router. The I/O manager ASIC 715 on the PIC 710,610' is responsible for managing the connection to the I/O manager ASIC 722 on the FPC 720,620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/642'. The Internet processor 742/642' performs the route lookup using the forwarding table 744 and sends the information over to a second DBM ASIC 735b'. The Internet processor ASIC 742/642' also collects exception packets (i.e., those without a forwarding table entry) and sends them to the control component 610. The second DBM ASIC 735b' then takes this information and the 74-byte blocks and forwards them to the I/O manager ASIC 722 of the egress FPC 720/620' (or multiple egress FPCs, in the case of multicast) for reassembly. (Thus, the DBM ASICs 735a' and 735b' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735b', incrementing TTL values, queuing a pointer to the packet, if necessary, before applying CoS rules, re-encapsulating the blocks, and sending the encapsulated packets to the PIC I/O manager ASIC 715.

Figure 9:
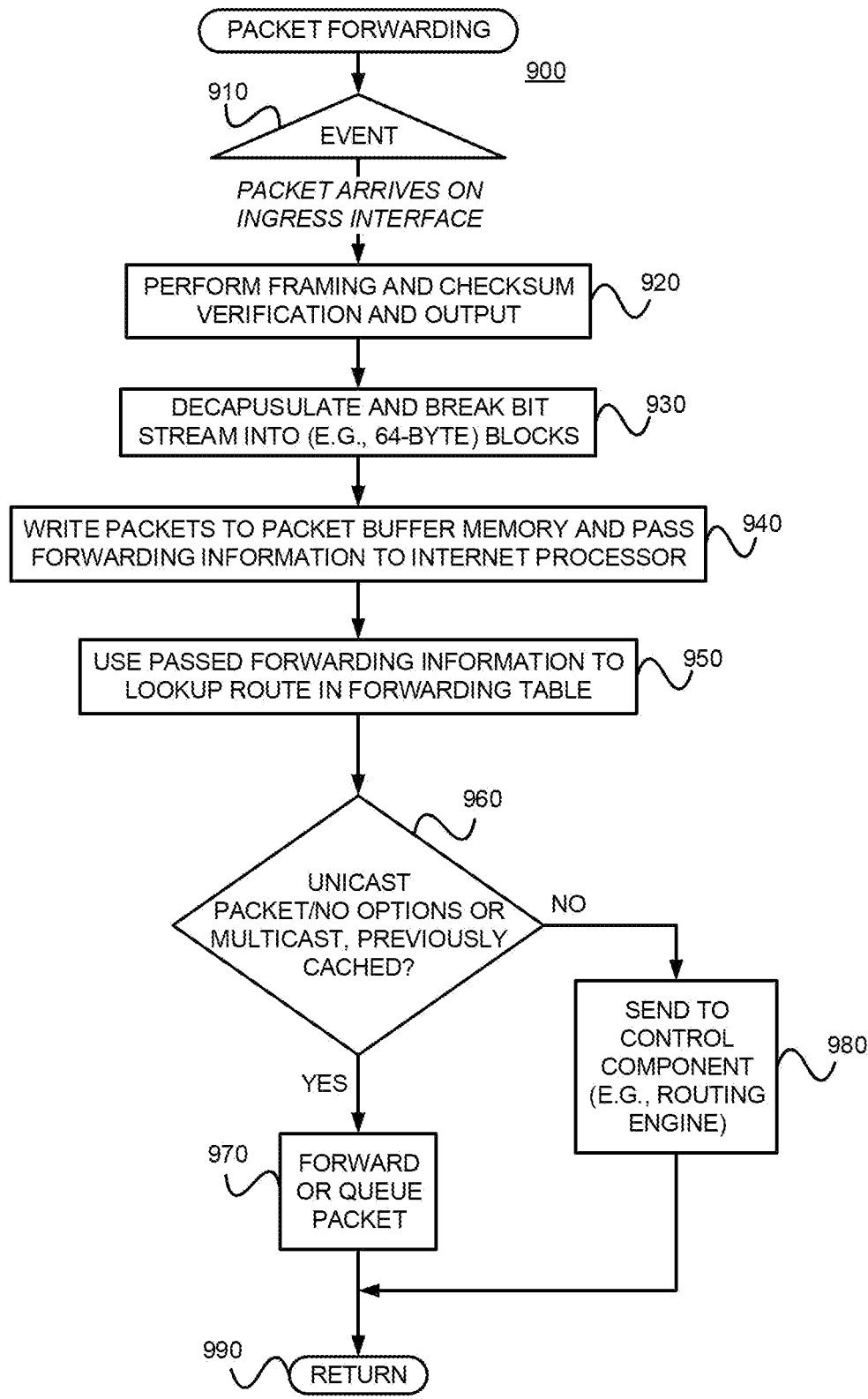
FIG. 9 is a flow diagram of an example packet forwarding method that may be implemented on any of the example routers of FIGS. 6 and 7.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735b. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present description may be implemented on the example routers of FIG. 5 or 6, embodiments consistent with the present description may be implemented on communications network nodes (e.g., routers, switches, etc.) having different architectures. More generally, embodiments consistent with the present description may be implemented on an example system 900 as illustrated on FIG. 10.

Figure 10:
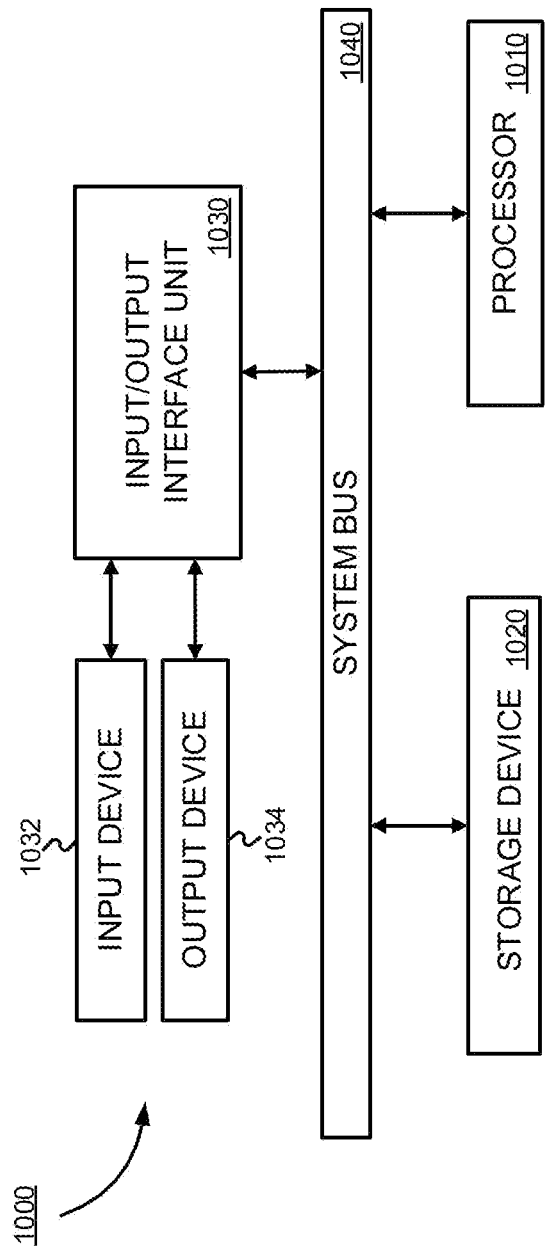
FIG. 10 is a block diagram of an example processor-based system that may be used to execute the example methods described, and/or to store information used and/or generated by such example methods.

FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the present description.

In some embodiments consistent with the present description, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements, Extensions and Alternatives

The return path label stack may (though need not) be included within the ping request message or traceroute message as a new TLV "Return Label Stack TLV," such as that described in the '540 application. As described in the '540 application, each TLV may contain a list of labels, which may be a prefix-SID, adjacency-SID, binding-SID, etc. An example MPLS ping request message or MPLS traceroute message consistent with the present description should contain this TLV, which defines reverse path to reach source from the destination. FIGS. 4-6 of the '540 application illustrate example data structures which may be used for carrying MPLS ping and/or traceroute information.

§ 4.5 Conclusions

The foregoing methods and apparatus provide efficient and easy mechanisms which can support Inter-AS ping and traceroute.

What is claimed is:

1. A computer-implemented method for use in ping request or traceroute operations in a multi-autonomous system (AS) segment routed (SR) path including a headend router in a first AS and an egress router in an AS other than the first AS, the first AS having a first AS border router (ASBR) and a second AS having a second ASBR peering with the first ASBR, the computer-implemented method comprising:
   a) receiving, by a router in the second AS, a ping or traceroute request from the headend router in the first AS, the ping or traceroute request including a reverse path label pair, and the reverse path label pair including
      1) a node segment identifier (SID) corresponding to the second ASBR of the second AS, and
      2) an egress peer engineering (EPE) SID corresponding to a segment between the second ASBR and the first ASBR;
   b) generating, by the router and responsive to receiving the ping or traceroute request, a ping or traceroute reply including the reverse path label pair; and
   c) forwarding the ping or traceroute reply to the second ASBR using the node SID of the reverse path label pair.

2. The computer-implemented method of claim 1, further comprising:
   d) forwarding the ping or traceroute reply from the second ASBR to the first ASBR using the EPE SID of the reverse path label pair.

3. The computer-implemented method of claim 2, further comprising:
   e) forwarding the ping or traceroute reply from the first ASBR to the headend router.

4. The computer-implemented method of claim 3 wherein the act of forwarding the ping or traceroute reply from the first ASBR to the headend router is performed using normal Internet protocol (IP) forwarding.

5. The computer-implemented method of claim 3 wherein the act of forwarding the ping or traceroute reply from the first ASBR to the headend router is performed using forwarding information learned from an interior gateway protocol (IGP) run within the first AS.

6. The computer-implemented method of claim 1 wherein IP addresses are unique across the first and second ASes, and
   wherein the node SID corresponding to the second ASBR of the second AS is a first label, and the EPE SID corresponding to a segment between the second ASBR and the first ASBR is a second label.

7. The computer-implemented method of claim 1 wherein the egress router is in the second AS.

8. The computer-implemented method of claim 1 wherein the SR path does not include the second ASBR.

9. The computer-implemented method of claim 1 wherein the SR path does not include the first ASBR.

10. A computer-implemented method for use in ping request or traceroute operations in a multi-autonomous system (AS) segment routed (SR) path including a headend router in a first AS and an egress router in an AS other than the first AS, the first AS having a first AS border router (ASBR) and a second AS having a second ASBR peering with the first ASBR, the computer-implemented method comprising:
   a) receiving, by the second ASBR, an initial ping or traceroute request from the first ASBR, wherein the initial ping or traceroute request does not include a reverse label pair;
   b) responsive to receiving the initial ping or traceroute request from the first ASBR, generating an initial ping or traceroute reply including a reverse path label pair, the reverse path label pair including
      1) a node segment identifier (SID) corresponding to the second ASBR of the second AS, and
      2) an egress peer engineering (EPE) SID corresponding to a segment between the second ASBR and the first ASBR; and
   c) sending, by the second ASBR, the initial ping or traceroute reply towards the headend router via the first ASBR.

11. The computer-implemented method of claim 10 further comprising:
   d) receiving, by the headend router, the initial ping or traceroute reply;
   e) generating, by the headend router and responsive to receiving the initial ping or traceroute reply, a further ping or traceroute request including the reverse path label pair; and
   f) forwarding the further ping or traceroute request to the second ASBR using the node SID of the reverse path label pair.

12. The computer-implemented method of claim 10 wherein the SR path includes the second ASBR.

13. The computer-implemented method of claim 10 wherein the SR path includes the first ASBR.

14. The computer-implemented method of claim 10 wherein the SR path does not include the second ASBR.

15. The computer-implemented method of claim 10 wherein the SR path does not include the first ASBR.

16. A computer-implemented method for use in a headend router of a multi-autonomous system (AS) segment routed (SR) path, the headend router belonging to a first AS, and the multi-AS SR path including an egress router in an AS other than the first AS, the first AS having a first AS border router (ASBR) and a second AS having a second ASBR peering with the first ASBR, the computer-implemented method comprising:
   a) receiving a reverse path label pair including
      1) a node segment identifier (SID) corresponding to the second ASBR of the second AS, and
      2) an egress peer engineering (EPE) SID corresponding to a segment between the second ASBR and the first ASBR;
   b) storing the reverse path label pair received;
   c) generating a ping or traceroute request including the reverse path label pair for use in a ping or traceroute reply; and
   d) sending, from the headend router, the ping or traceroute request.

17. The computer-implemented method of claim 16 wherein the SR path includes the second ASBR.

18. The computer-implemented method of claim 16 wherein the SR path includes the first ASBR.

19. The computer-implemented method of claim 16 wherein the SR path does not include the second ASBR.

20. The computer-implemented method of claim 16 wherein the SR path does not include the first ASBR.

* * * * *